(12) United States Patent
Liu et al.

(10) Patent No.: US 9,423,798 B2
(45) Date of Patent: Aug. 23, 2016

(54) METHOD FOR POSITIONING A MOBILE ROBOT AND A MOBILE ROBOT IMPLEMENTING THE SAME

(71) Applicants: LITE-ON ELECTRONICS (GUANGZHOU) LIMITED, Guangzhou (CN); LITE-ON TECHNOLOGY CORP., Taipei (TW)

(72) Inventors: Hong-Lun Liu, Taipei (TW); Bo-Zong Wu, Taipei (TW)

(73) Assignees: Lite-On Electronics (Guangzhou) Limited, Guangzhou (CN); Lite-On Technology Corp., Taipei (TW)

(*) Notice: Subject to any disclaimer, the term of this patent is extended or adjusted under 35 U.S.C. 154(b) by 0 days.

(21) Appl. No.: 14/262,940

(22) Filed: Apr. 28, 2014

(65) Prior Publication Data

US 2014/0343757 A1    Nov. 20, 2014

(30) Foreign Application Priority Data

May 17, 2013   (CN) .......................... 2013 1 0185934

(51) Int. Cl.
    *G05D 1/02*     (2006.01)
(52) U.S. Cl.
    CPC ...... *G05D 1/028* (2013.01); *G05D 2201/0203* (2013.01); *Y10S 901/01* (2013.01)
(58) Field of Classification Search
    CPC .. G05D 1/028; G05D 1/0225; G05D 1/0246; G01S 11/16; A47L 9/106; B25J 9/1682; G01C 17/26; B23K 26/0884; G03G 21/0029

USPC ............. 701/2, 23; 700/2, 245; 340/540; 367/128; 399/351

See application file for complete search history.

(56) References Cited

U.S. PATENT DOCUMENTS

| | | | | |
|---|---|---|---|---|
| 5,475,600 A | * | 12/1995 | Kim | G01C 17/26 356/139.07 |
| 7,711,308 B2 | * | 5/2010 | Hozumi | G03G 1/0029 15/256.51 |
| 7,974,735 B2 | * | 7/2011 | Irie | B23K 26/0884 318/568.11 |
| 2003/0105534 A1 | * | 6/2003 | Hara | B25J 9/1682 700/2 |
| 2006/0217837 A1 | * | 9/2006 | Koga | G05D 1/0246 700/245 |
| 2007/0280052 A1 | * | 12/2007 | Kong | G01S 5/26 367/128 |
| 2008/0065266 A1 | * | 3/2008 | Kim | G05D 1/0225 700/245 |
| 2012/0169497 A1 | * | 7/2012 | Schnittman | A47L 9/106 340/540 |

\* cited by examiner

*Primary Examiner* — Yuri Kan
(74) *Attorney, Agent, or Firm* — Rosenberg, Klein & Lee

(57) ABSTRACT

First and second positioning devices disposed at first and second stationary locations transmit first and second pilot signals, respectively. Transmission coverages of the first and second pilot signals have an area of overlap. When a mobile robot moves to the area of overlap, the mobile robot determines first angular orientation information between the mobile robot and the first positioning device, and second angular orientation information between the mobile robot and the second positioning device. The mobile robot then determines an initial position of the mobile robot based on the first stationary location, the second stationary location, the first angular orientation information, and the second angular orientation information.

18 Claims, 9 Drawing Sheets

METHOD FOR POSITIONING A MOBILE
ROBOT AND A MOBILE ROBOT
IMPLEMENTING THE SAME

CROSS-REFERENCE TO RELATED
APPLICATION

This application claims priority of Chinese application no. 201310185934.2, filed on May 17, 2013.

BACKGROUND OF THE INVENTION

1. Field of the Invention

The present invention relates to a method for positioning a mobile robot and a mobile robot to implement the same.

2. Description of the Related Art

In the prior art, a cleaning robot usually performs exploration of a surrounding space, as a spatial reference for moving around in that space. For example, the cleaning robot will first detect the area of surrounding space, learning the positions of obstacles and specific landmarks. Therefore, in the cleaning process, an optimized cleaning route can be generated for avoiding obstacles or approaching landmarks.

There are two common types of environment exploration schemes. The first type utilizes the cleaning robot to simultaneously record the path scenery using a camera device while moving and record the coordinates of the cleaning robot, and then combines the path scenery and the recorded coordinates to map out the entire surrounding space. The second type utilizes a laser device on the cleaning robot to output a laser of a fixed intensity, which is reflected by obstacles. The cleaning robot calculates the distance between the obstacles and itself based on the detected strength of the reflected laser, obtaining the map information of the surrounding space.

However, the camera device and the laser device are sophisticated electronic products of high manufacturing cost. The cleaning robot with the camera device also has to be equipped with a high-end processor for image comparison of scenery images. These high cost factors reduce price competitiveness of the cleaning robot in the market.

Additionally, when the cleaning robot is moving, it may encounter terrains that are uneven or sloped, and therefore there is a need to adjust the motor to control the rotation speed of left and right wheels of the cleaning robot for adjusting the movement direction of the cleaning robot. However, even if the processor of the cleaning robot has provided the desired motor operation information in accordance with path conditions, inaccuracy in the actual motor speed and wear of the wheels may cause the cleaning robot to be unable to move in a desired direction, and thus gradually accumulates path error. As a result, the cleaning robot is not able to move precisely in accordance with the acquired map information.

SUMMARY OF THE INVENTION

The object of the present invention is to provide a positioning method for a mobile robot that can reduce path error of the mobile robot while moving.

According to one aspect of the present invention, the positioning method for a mobile robot includes the steps of:

transmitting, by a first positioning device that is disposed at a first stationary location relative to the mobile robot, a first pilot signal;

transmitting, by a second positioning device that is disposed at a second stationary location relative to the mobile robot and the first positioning device, a second pilot signal, wherein a transmission coverage of the second pilot signal has an area of overlap with a transmission coverage of the first pilot signal;

moving, by the mobile robot, to the area of overlap;

determining, by the mobile robot, first angular orientation information between the mobile robot and the first positioning device, and second angular orientation information between the mobile robot and the second positioning device; and determining, by the mobile robot, an initial position of the mobile robot based on the first stationary location, the second stationary location, the first angular orientation information, and the second angular orientation information.

Another object of the present invention is to provide a mobile robot to implement the positioning method of this invention.

According to another aspect of the present invention, the mobile robot is for use with a first positioning device and a second positioning device. The first positioning device is to be disposed at a first stationary location relative to the mobile robot and is configured to transmit a first pilot signal. The second positioning device is to be disposed at a second stationary location relative to the mobile robot and the first positioning device and configured to transmit a second pilot signal. A transmission coverage of the second pilot signal has an area of overlap with a transmission coverage of the first pilot signal. The mobile robot comprises:

a housing;

a motion module disposed in the housing and operable to drive movement of the housing;

a pilot signal detector disposed on the housing and configured to detect the first pilot signal and the second pilot signal; and a processor disposed in the housing and coupled electrically to the motion module and the pilot signal detector;

wherein the processor is configured to control the motion module to move the housing to the area of overlap, determine first angular orientation information between the pilot signal detector and the first positioning device, and second angular orientation information between the pilot signal detector and the second positioning device when the housing is at the area of overlap, and determine an initial position of the mobile robot based on the first stationary location, the second stationary location, the first angular orientation information, and the second angular orientation information.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
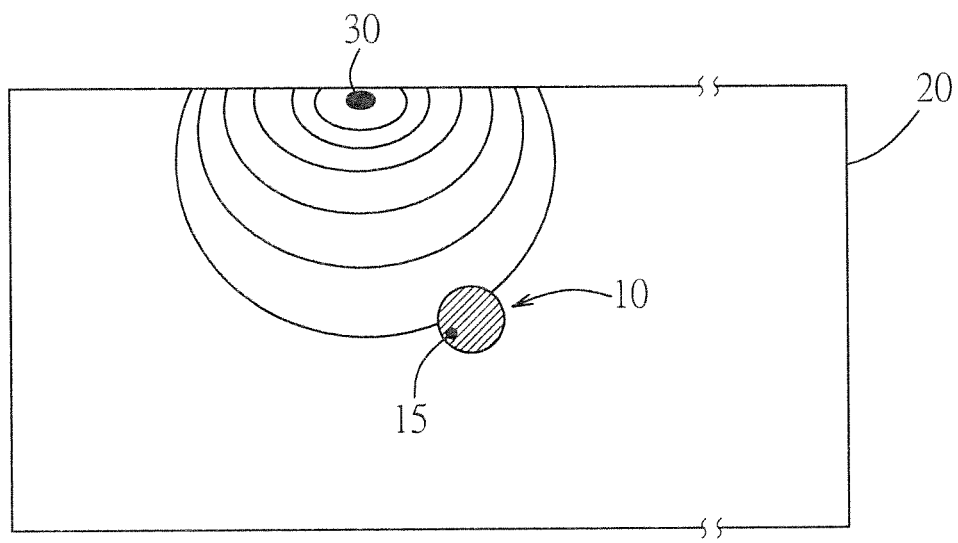
FIG. 1 is a schematic illustration illustrating a mobile robot and a positioning device in a first embodiment of the present invention.

Referring to FIG. 1, a first embodiment of the mobile robot 10 of the present invention is capable of moving in a space 20 that is provided with a positioning device 30. The mobile robot 10 can perform position calibration based on a pilot signal transmitted by the positioning device 30. In this embodiment, while the mobile robot 10 is moving, the positioning device 30 is disposed at a stationary location relative to the mobile robot 10, and the positioning device 30 may be implemented as a charger, a beacon for defining a virtual wall, or other devices that are capable of transmitting the pilot signal.

Figure 2:
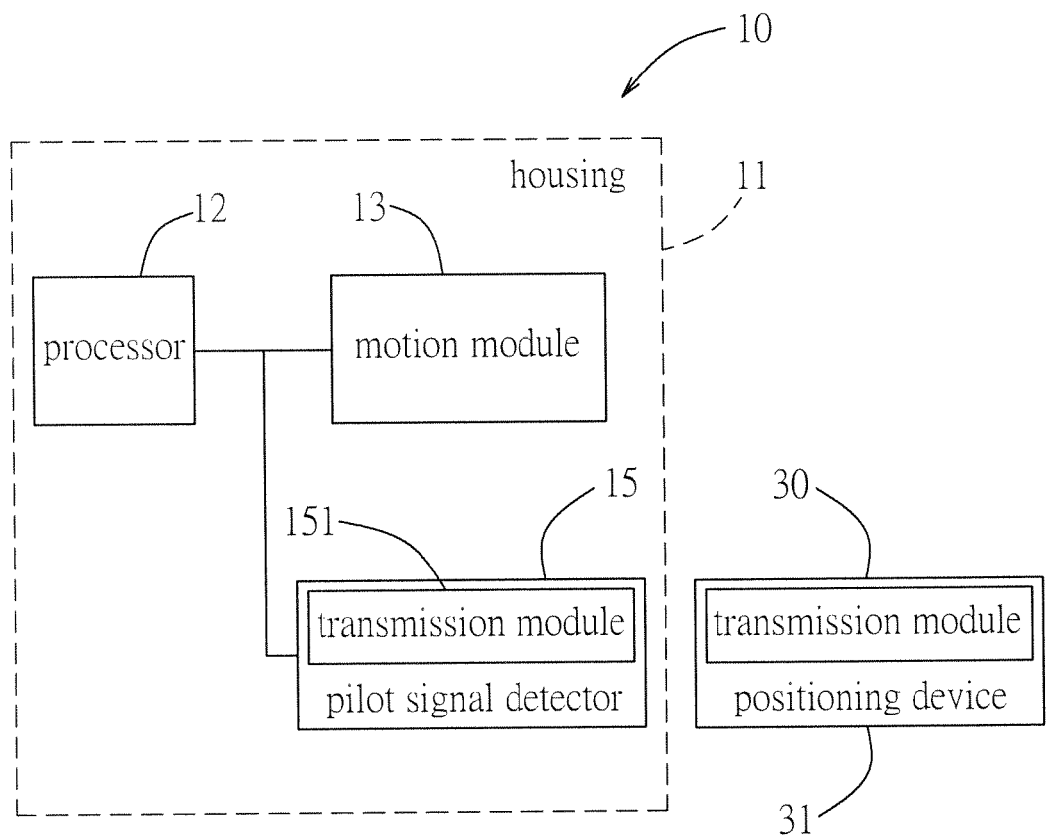
FIG. 2 is a block diagram illustrating the mobile robot and the positioning device in the first embodiment of the present invention.

Referring to FIG. 2, the mobile robot 10 of this embodiment includes a housing 11, and a processor 12, a motion module 13 and a pilot signal detector 15 which are disposed at the housing 11. The processor 12 is electrically coupled with the motion module 13 and the pilot signal detector 15.

The pilot signal detector 15 is used for detecting the pilot signal sent by the positioning device 30. The processor 12, according to the information detected by the pilot signal detector 15, commands the motion module 13 to move and rotate the housing 11. When the motion module 13 drives the housing 11 to move, the components in the housing 11 of the mobile robot 10 move together as well. Likewise, when the motion module 13 drives the housing 11 to rotate, the components inside the housing 11 of the motion module 13 will rotate together as well.

Figure 3:
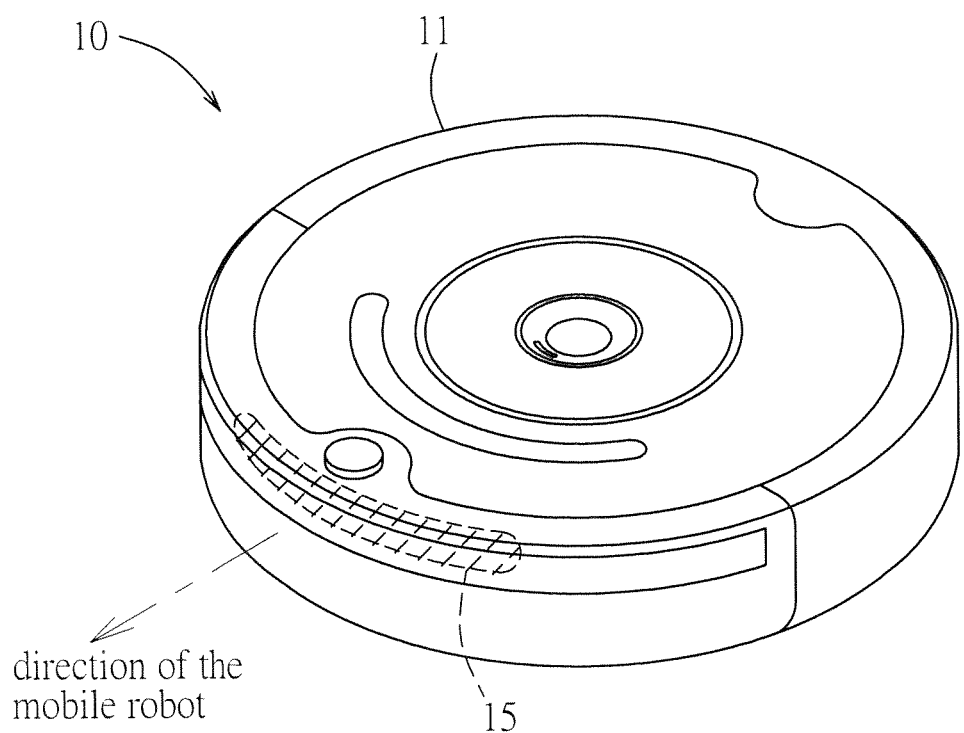
FIG. 3 is a perspective view illustrating the mobile robot being guided by a direction detector to move forward.

The motion module 13 includes a plurality of wheels (not shown). As shown in FIG. 3, the housing 11 may have an annular lateral side and a body having a bottom surface that is substantially flat and round, and the pilot signal detector 15 is disposed along a portion of the annular lateral side of the housing 11.

Figure 4:
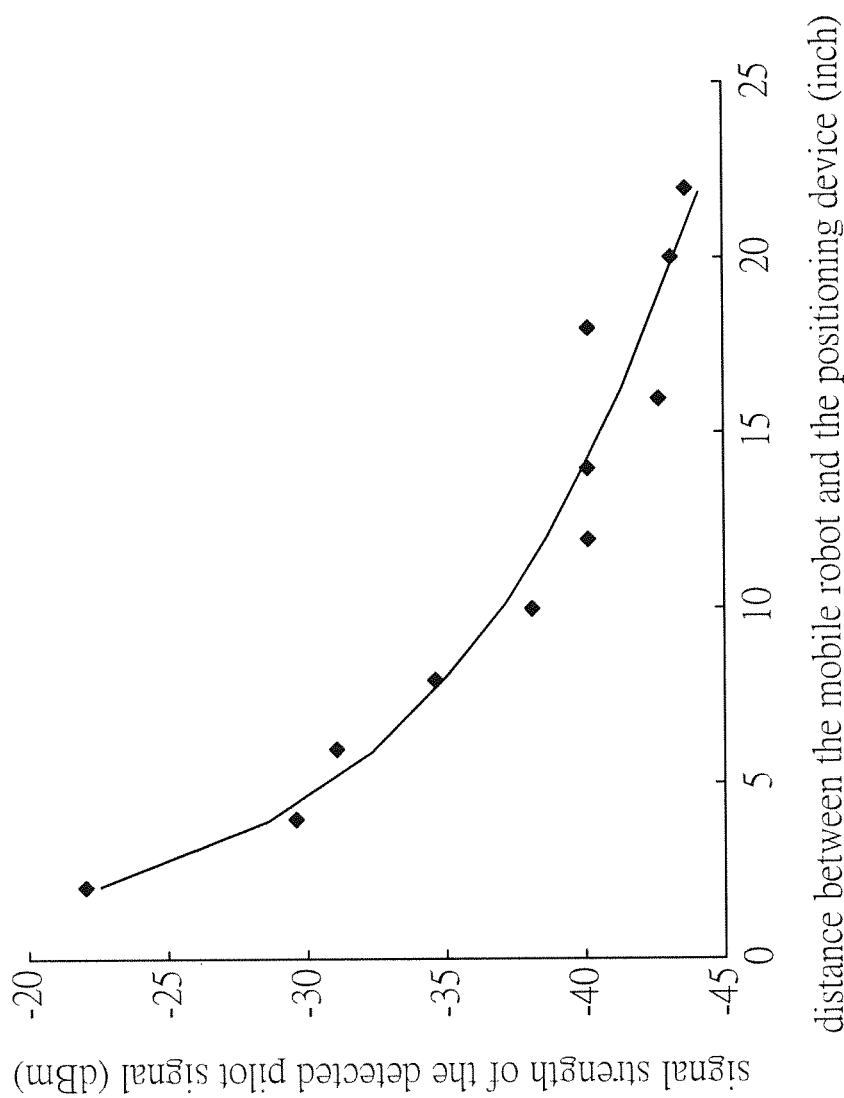
FIG. 4 is a chart illustrating the signal strength of the detected pilot signal varying with the distance of the mobile robot to the positioning device.

The mobile robot 10 of the present invention implements the positioning method of the first embodiment by using the pilot signal detector 15 to detect the pilot signal transmitted by the positioning device 30 for realizing positioning calibration of the mobile robot 10. In this embodiment, Received Signal Strength Indication (RSSI) of the pilot signal is detected, but other characteristics of the pilot signal may be used. The emission power of the pilot signal emitted by the positioning device 30 can be controlled externally, and the mobile robot 10 is notified of the emission power. Referring to FIG. 1, the pilot signal strength is typically the strongest at the positioning device 30, and gradually decreases away from the positioning device 30. More specifically, "signal strength of the detected pilot signal" will be inversely proportional to "the distance between the mobile robot 10 and the positioning device 30," as shown in FIG. 4.

Figure 5:
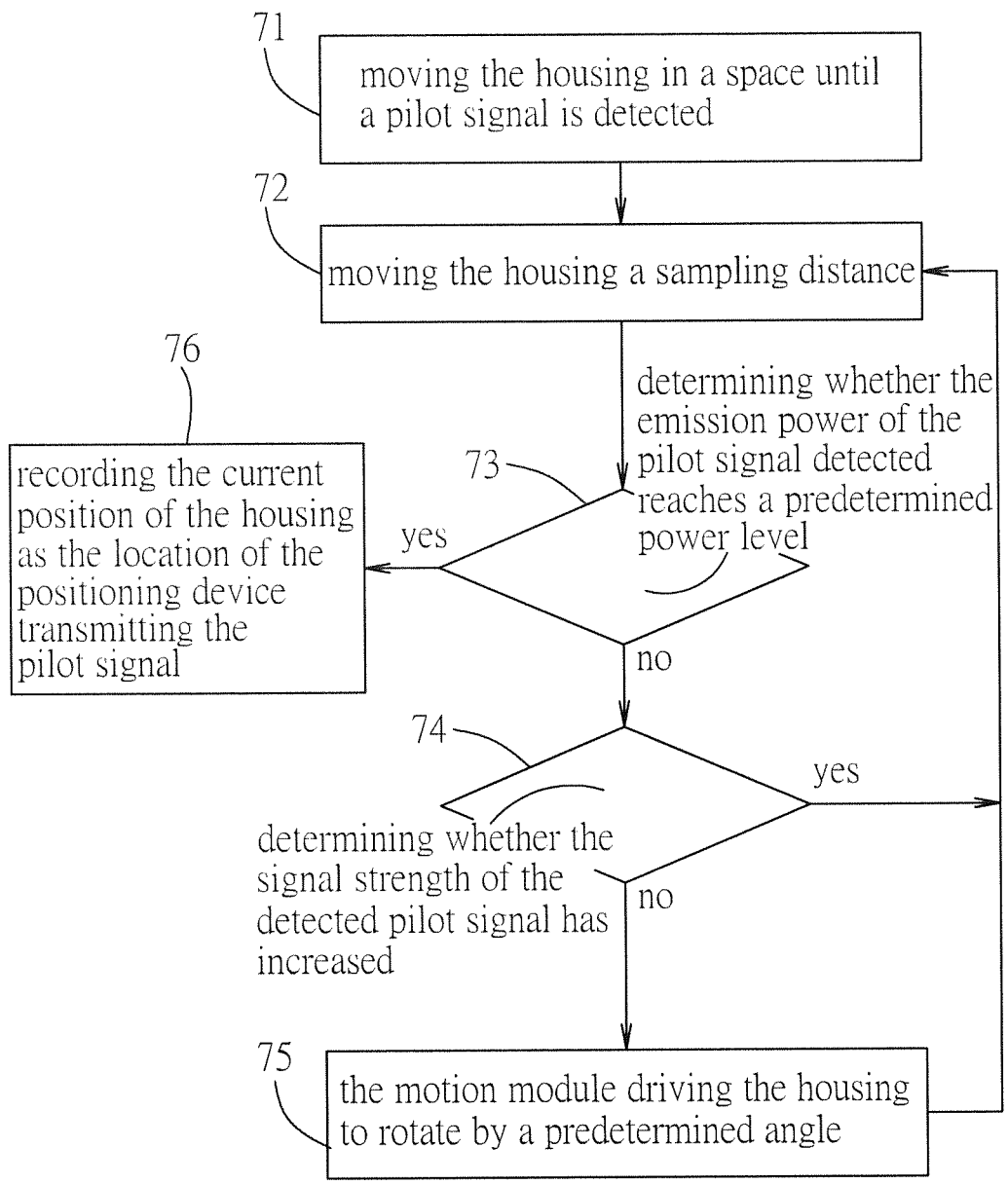
FIG. 5 is a flowchart illustrating a positioning method for the mobile robot in the first embodiment.

Referring to FIG. 5, the positioning method includes the steps of:

Step 71: The housing 11 is driven by the motion module 13 to move in a space 20 (displacement and rotation), until the pilot signal detector 15 detects the pilot signal.

Step 72: The housing 11 moves a sampling distance.

Step 73: The processor 12 determines whether the emission power of the pilot signal detected by the pilot signal detector 15 reaches a predetermined power level. If yes, the flow proceeds to step 76. Otherwise, the flow proceeds to step 74.

Step 74: The processor 12 determines whether the signal strength of the pilot signal detected by the pilot signal detector 15 has increased. If yes, the flow returns to step 72. Otherwise, the flow proceeds to step 75.

Step 75: The processor 12 commands the motion module 13 to drive the housing 11 to rotate by a predetermined angle, and the flow returns to step 72.

Preferably, in the first time of execution of step 75, the housing 11 is rotated clockwise 90°, and in the subsequent executions of step 75, the housing 11 is rotated 180° in the direction opposite to the direction of rotation in the previous execution of step 75. In another application, in the first time of execution of step 75, the housing 11 is rotated counter-clockwise 90°. The angle of rotation in the first time of execution of step 75 is not limited to 90° clockwise or counter-clockwise, and may be 15°, 30°, 45°, 60°, 75° or any other predetermined angle.

Step 76: The processor 12 records the current position of the housing 11 as the location of the positioning device 30 transmitting the pilot signal.

Subsequently, when the mobile robot 10, which previously does not detect any pilot signal while moving in space 20, detects the pilot signal once again, the mobile robot 10 will again perform the steps 72 to 75 of the positioning method, and the position of the mobile robot 10 is calibrated to become the location of the positioning device 30 obtained in step 76.

Accordingly, the accumulation of path error due to various internal factors and environmental factors while the mobile robot 10 travels on space 20 can be corrected by performing the above-mentioned positioning method for calibration of the position of the mobile robot 10 to the one obtained in step 76.

Figure 6:
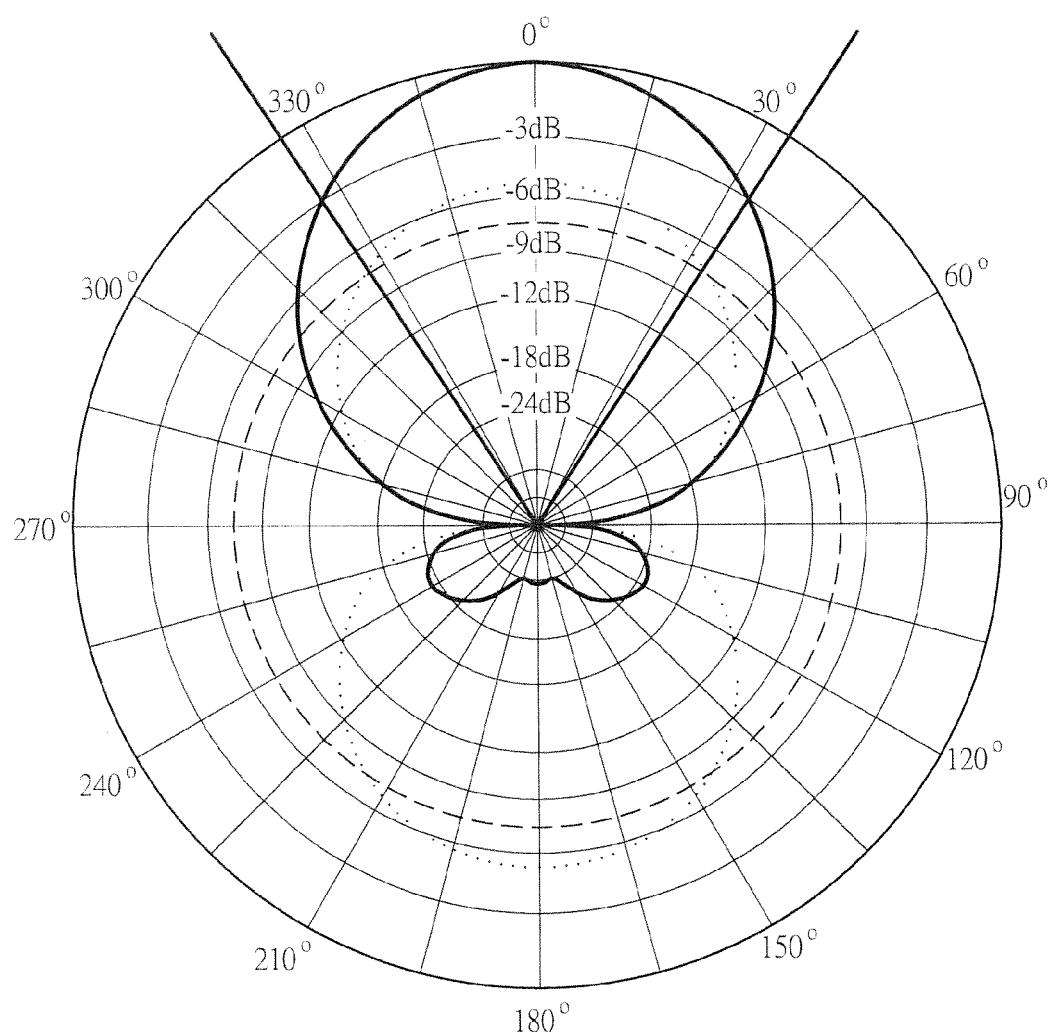
FIG. 6 is a graphical representation illustrating the beam pattern of the pilot signal detector.

In the present embodiment, the positioning device 30, as shown in FIG. 2, includes a ZigBee transmission module 31 having an omni-directional antenna (not shown). The pilot signal detector 15 includes a ZigBee transmission module 151 having a directional antenna (not shown). The beam pattern of the directional antenna is represented by the solid line drawn in FIG. 6, which has maximum reception characteristic in a particular direction (i.e., 0°). ZigBee transmission protocol mainly operates in the frequency band with center frequency at 2.45 GHz, supports 250 kbps data transfer rate, and has effective transmission coverage of up to 100 to 400 meters. The ZigBee transmission standard is implemented using miniature circuits, and provides low cost and low power consumption benefits. Therefore, the mobile robot 10 in the present embodiment utilizes the ZigBee transmission modules 151,31 to effectively reduce manufacturing cost and power consumption. In other applications, radio frequency identification (RFID), Bluetooth and other low-cost transmission modules can be used to replace the ZigBee transmission modules 151,31.

Figure 7:
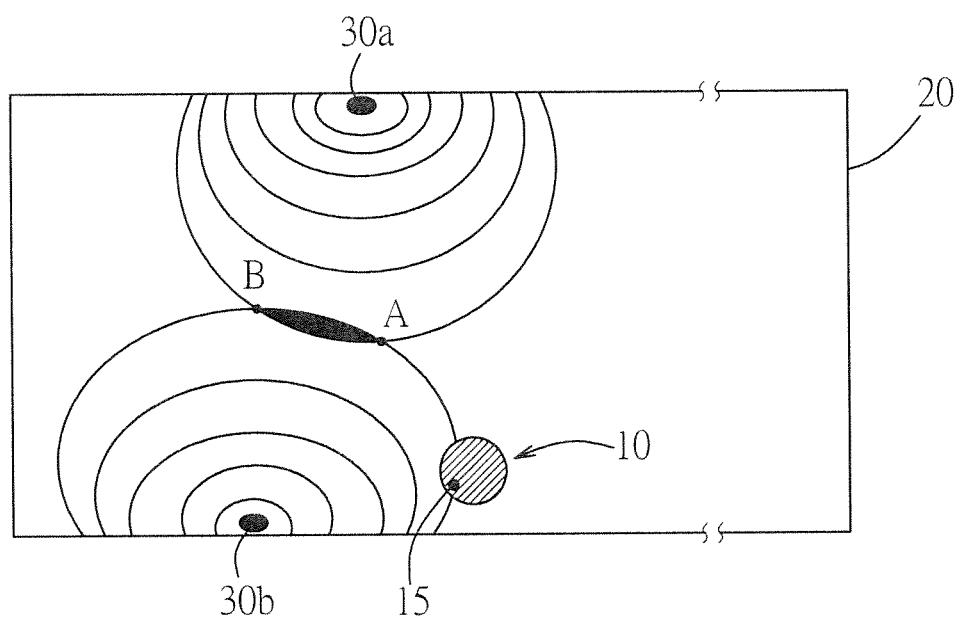
FIG. 7 is a diagram illustrating the mobile robot and two positioning devices in a second embodiment of the present invention.

Referring to FIG. 7, as compared to the first embodiment of the present invention, the mobile robot 10 of the second embodiment is different in that: A first positioning device 30a and a second positioning device 30b are disposed in a space 20. The first positioning device 30a transmits a first pilot signal having a first emission power, and the second positioning device 30b transmits a second pilot signal having a second emission power. The signal strength of the first pilot signal is typically the strongest at the first positioning device 30a, and decreases exponentially and in gradients away from the first positioning device 30a, and the signal strength of the second pilot signal is typically the strongest at the second positioning device 30b, and decreases exponentially and in gradients away from the second positioning device 30b.

In the second embodiment, the first and second positioning devices 30a, 30b are controlled externally for causing a transmission coverage of the second pilot signal to have an area of overlap with a transmission coverage of the first pilot signal. Using both the information detected by the mobile robot 10 located in the area of overlap of the transmission coverage of the first and second pilot signals and the locations of the first and second positioning devices 30a and 30b, the mobile robot 10 is able to perform position and angle self-calibrations.

Figure 8:
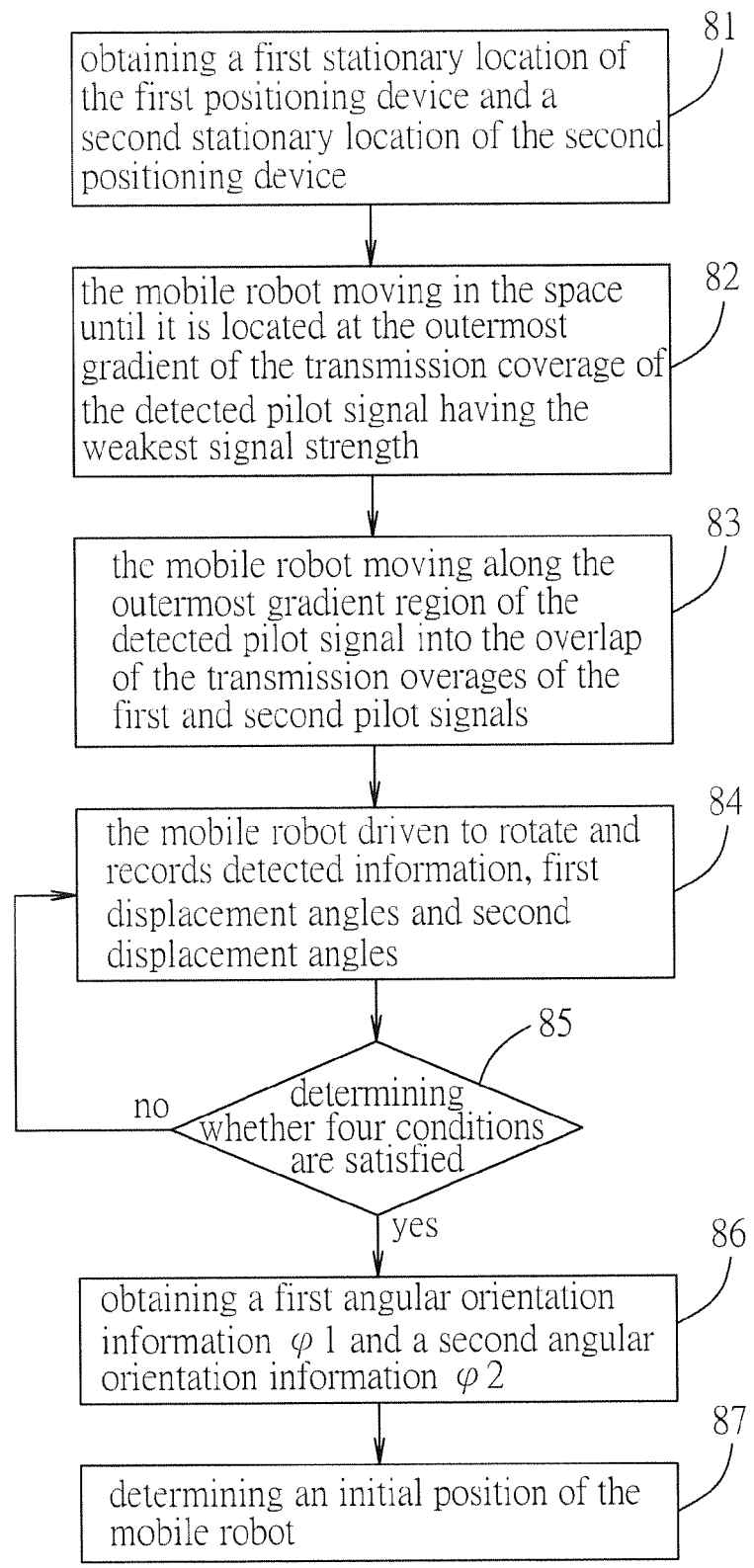
FIG. 8 is a flowchart illustrating another positioning method for the mobile robot in the second embodiment.

Referring to FIG. 8, the positioning method performed by the mobile robot 10 in the second embodiment of the present invention includes the following steps:

Step 81: The mobile robot 10 performs the steps 71 to 76 illustrated in FIG. 5, to obtain a first stationary location (x1, y1) of the first positioning device 30a and a second stationary location (x2, y2) of the second positioning device 30b, wherein the emission power detected by the mobile robot 10 at the first stationary location (x1, y1) reaches a first predetermined power level, and the emission power detected by the mobile robot 10 at the second stationary location (x2, y2) reaches a second predetermined power level.

Step 82: The mobile robot 10, while not detecting any of the first and second pilot signals, moves in the space 20 until the pilot signal detector 15 detects one of the first and second pilot signals. At this point mobile robot 10 should be located at the outermost gradient of the transmission coverage of the detected pilot signal having the weakest signal strength.

Step 83: The mobile robot 10 moves along the outermost gradient region of the detected pilot signal, and records an initial angle of the mobile robot 10 when the mobile robot 10 first moves into the area of overlap of the transmission overages of the first and second pilot signals.

Step 84: The processor 12 controls the motion module to drive the mobile robot 10 to rotate in a predetermined sampling duration, and records detected information, first displacement angles and second displacement angles.

The detected information, for instance, may be the information of whether the first pilot signal or the second pilot signal is detected.

As the mobile robot 10 rotates in the predetermined sampling duration, the pilot signal detector 15 detects different signal strengths of the first pilot signal, and the processor 12 records the detected signal strengths of the first pilot signal corresponding to predetermined angular displacements of the mobile robot 10 from the initial angle (first displacement angles). Similarly, in the predetermined sampling duration, the processor 12 records the detected signal strengths of the second pilot signal corresponding to predetermined angular displacements of the mobile robot 10 from the initial angle (second displacement angles).

It is worth mentioning that, the signal strength of the first pilot signal detected by the pilot signal detector 15 is weaker than the strength of the first pilot signal emitted by the first positioning device 30a. Similarly, the signal strength of the second pilot signal detected by the pilot signal detector 15 is weaker than the strength of the second pilot signal emitted by the second positioning device 30b. Moreover, as the mobile robot 10 rotates in the predetermined sampling duration, the angular displacement of the mobile robot 10 from the initial angle changes, and thus the mobile robot 10 has a specific first displacement angle each time the robot 10 rotates. Similarly, the mobile robot 10 has a specific second displacement angle each time the mobile robot 10 rotates.

Step 85: The processor 12, based on all the recorded detected information, determines whether the following four conditions are satisfied. If yes, the flow proceeds to step 86. Otherwise, the flow returns to step 84.

first condition: The mobile robot 10 while not detecting the first pilot signal, rotates to a predetermined angular displacement and detects the first pilot signal.

second condition: The mobile robot 10 while detecting the first pilot signal, rotates to a predetermined angular displacement and then fails to detect the first pilot signal.

third condition: The mobile robot 10 while not detecting the second pilot signal, rotates to a predetermined angular displacement and then detects the second pilot signal.

fourth condition: The mobile robot 10 while detecting the second pilot signal, rotates to a predetermined angular displacement and then fails to detect the second pilot signal.

Step 86: The processor 12 calculates the angular difference of the predetermined angular displacements in the first and second conditions, and obtains first angular orientation information φ1 related to the first positioning device 30a, and calculates the angular difference of the predetermined angular displacements in the third and fourth conditions, and obtains second angular orientation information φ2 related to the second positioning device 30b.

More specifically, the first angular orientation information φ1 represents the broadest angular range that the first pilot signal can be detected by the mobile robot 10, and the second angular orientation information φ2 represents the broadest angular range that the second pilot signal can be detected by the mobile robot 10.

Step 87: The processor 12 determines an initial position of the mobile robot 10 according to the following equations:

$$\begin{cases} Y = (X - x1)\tan\phi 1 + y1 \\ Y = (X - x2)\tan\phi 2 + y2 \end{cases}$$

wherein (x1,y1) is the first stationary location of the first positioning device 30a, (x2, y2) is the second stationary location of the second positioning device 30b, φ1 is the first angular orientation information and φ2 is the second angular orientation information.

Subsequently, when the mobile robot 10, which does not detect any pilot signal while moving in space 20, detects any one of the first and second pilot signal once again, the mobile robot 10 will move along the outermost gradient region of the transmission coverage of the detected pilot signal until it reaches the area of overlap of the transmission overages of the first and second plot signals. The mobile robot 10 then calibrates its position (x,y) by replacing it with the initial position previously calculated in step 87.

Figure 9:
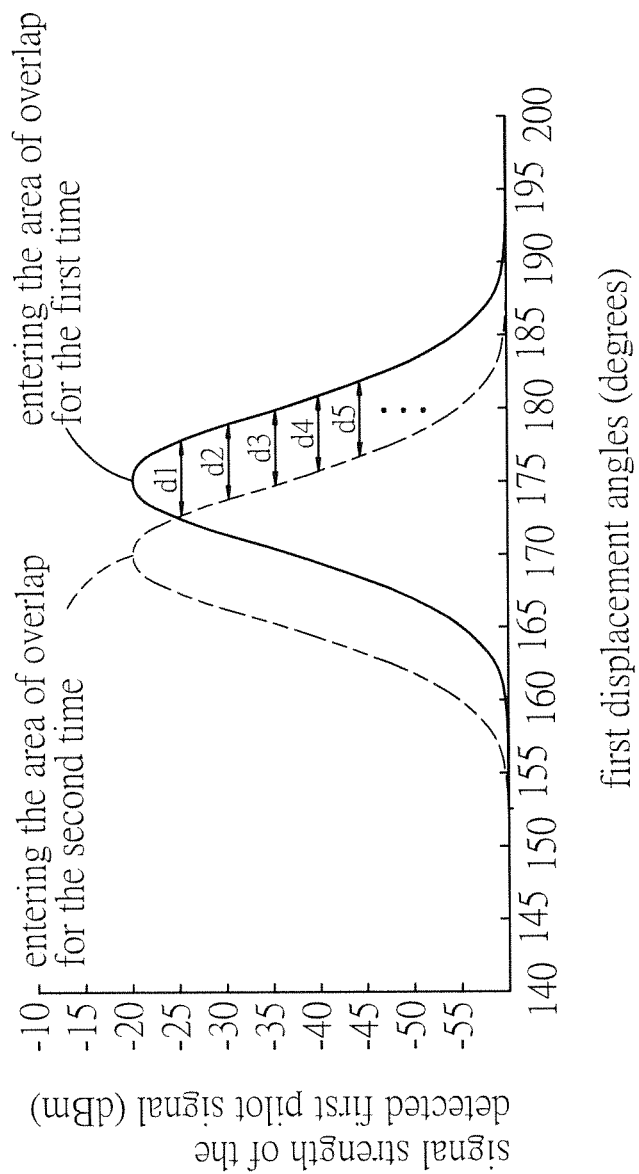
FIG. 9 is a chart illustrating the relationship between the detection angle and the detected signal strength of the first pilot signal.

The following describes the calibration of the current angle of the mobile robot 10 in detail. When the mobile robot 10 first enters the overlap area (may occur simultaneously with the calibration of the position of the mobile robot 10), the mobile robot 10 rotates counterclockwise, and at the same time the mobile robot 10 will detect the first signal strengths of the first pilot signal corresponding to the predetermined angular displacements. The relationship between the first signal strengths of the first pilot signal and the predetermined angular displacements, when the mobile robot 10 first enters the overlap area, can be referred to in FIG. 9 (solid bell shaped curve in FIG. 9).

When the mobile robot 10 returns to the overlap area again, the mobile robot 10 will rotate counterclockwise to detect the first signal strength of the first pilot signal corresponding to each predetermined angular displacement (dotted bell shaped curve in FIG. 9) The processor 12 then calculates the difference of first predetermined angular displacement di (i=1, 2 . . . N) between the two curves by comparing, given a particular first signal strength Ri, the first predetermined angular displacement of the solid bell shaped curve and that of the dotted bell shaped curve.

Thereafter, the processor 12 calculates a compensation angle according to the formula, $$D = \left(\sum_{i=1}^{N} d_i\right) / N,$$

and calibrates the current angle of the mobile robot 10 by the value of D. Similarly, the processor 12 can also calculate D based on the second signal strength of the second pilot signal instead of the first signal strength of the first pilot signal.

Preferably, in one embodiment, based on the compensation angle of the first signal strength of the first pilot signal and that of the second signal strength of the second pilot signal, the current angle of the mobile robot 10 can be calibrated. However, in other embodiments, only one compensation angle is necessary for calibration of the current angle of the mobile robot 10.

Although there are two positioning devices 30a, 30b in the second embodiment, additional positioning devices can be used to create multiple areas of overlap associated with pairs of pilot signals in other applications such that the position and current angle stored in the mobile robot 10 can be calibrated more frequently as the mobile robot 10 moves in space 20, thereby effectively reducing path errors.

In summary, the mobile robot 10 and the positioning device 30 of the preferred embodiments employ transmission modules that are cost efficient. The mobile robot 10 moves towards the positioning device 30 by following a direction in which the strength of the detected pilot signal of the positioning device 30 increases, and calibrates the stored position of the mobile robot 10 when it arrives at the positioning device 30. It may also search for and move into the area of overlap of the transmission coverage of two pilot signals for calibration of its position and its current angle, thereby reducing path errors.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A positioning method for a mobile robot, comprising the steps of:
   (A) transmitting, by a first positioning device that is disposed at a first stationary location relative to the mobile robot, a first pilot signal;
   (B) transmitting, by a second positioning device that is disposed at a second stationary location relative to the mobile robot and the first positioning device, a second pilot signal, wherein a transmission coverage of the second pilot signal has an area of overlap with a transmission coverage of the first pilot signal;
   (C) detecting the first and second pilot signal by the mobile robot, and moving the mobile robot along an outermost gradient region of said first or second pilot signal to the area of overlap; and
   (D) determining, by the mobile robot, an initial position of the mobile robot based on the first stationary location and the second stationary location when the mobile robot moves into the area of overlap.

2. The positioning method as claimed in claim 1, further comprising the steps of:
   determining, by the mobile robot, the first stationary location, including the sub-steps of moving in a direction where a detected emission power of the first pilot signal detected by the mobile robot is increasing, and recording a first position of the mobile robot as the first stationary location of the first positioning device when the detected emission power of the first pilot signal reaches a first predetermined power level; and
   determining, by the mobile robot, the second stationary location, including the sub-steps of moving in a direction where a detected emission power of the second pilot signal detected by the mobile robot is increasing, and recording a second position of the mobile robot as the second stationary location of the second positioning device when the detected emission power of the second pilot signal reaches a second predetermined power level.

3. The positioning method as claimed in claim 1, further comprising the steps of:
   recording an initial angle of the mobile robot when the mobile robot moves into the area of overlap, wherein the initial angle corresponds to a difference between a first angle at which a pilot signal detector of the mobile robot is facing when the mobile robot moves into the area of overlap, and a second angle at which the pilot signal detector of the mobile robot is facing at a time the mobile robot is activated; and
   detecting the first pilot signal and the second pilot signal while the mobile robot is rotated and recording detected information of the first pilot signal and the second pilot signal at predetermined angular displacements of the mobile robot from the initial angle.

4. The positioning method as claimed in claim 3, wherein the detected information of the first pilot signal and the second pilot signal that are recorded are related to detected signal strengths of the first pilot signal and the second pilot signal at the predetermined angular displacements of the mobile robot from the initial angle.

5. The positioning method as claimed in claim 3, further comprising the step of:
   determining, by the mobile robot, first angular orientation information between the mobile robot and the first positioning device, and second angular orientation information between the mobile robot and the second positioning device;
   wherein the first angular orientation information corresponds to an angular range within which the first pilot signal is deemed as being capable of being detected by the mobile robot, and the second angular orientation information corresponds to an angular range within which the second pilot signal is deemed as being capable of being detected by the mobile robot; and wherein, in step (D), the initial position of the mobile robot is determined based further on the first angular orientation information and the second angular orientation information.

6. The positioning method as claimed in claim 5, wherein the initial position (X, Y) of the mobile robot satisfies $$\begin{cases} Y = (X - x1)\tan\phi 1 + y1 \\ Y = (X - x2)\tan\phi 2 + y2 \end{cases}$$

wherein (x1,y1) is the first stationary location of the first positioning device, (x2, y2) is the second stationary location of the second positioning device, $\phi 1$ is the first angular orientation information and $\phi 2$ is the second angular orientation information.

7. The positioning method as claimed in claim 3, further comprising the step of:
when the mobile robot moves back into the area of overlap after leaving the area of overlap, setting, by the mobile robot, a current position thereof to the initial position, and a current angle thereof with reference to the detected information at the predetermined angular displacements recorded when the mobile robot first enters the area of overlap and the detected information at the predetermined angular displacements obtained when the mobile robot moves once again back into the area of overlap.

8. The positioning method as claimed in claim 1, wherein the mobile robot receives the first and second pilot signals from the first positioning device and the second positioning device using one of ZigBee, RFID and Bluetooth protocols.

9. A mobile robot for use with a first positioning device and a second positioning device, the first positioning device to be disposed at a first stationary location relative to the mobile robot and configured to transmit a first pilot signal, the second positioning device to be disposed at a second stationary location relative to the mobile robot and the first positioning device and configured to transmit a second pilot signal, a transmission coverage of the second pilot signal having an area of overlap with a transmission coverage of the first pilot signal, said mobile robot comprising:
a housing;
a motion module disposed in said housing and operable to drive movement of said housing;
a pilot signal detector disposed in said housing and configured to detect the first pilot signal and the second pilot signal; and
a processor disposed in said housing and electrically coupled to said motion module and said pilot signal detector;
wherein said processor is configured to control said motion module to move said housing along an outermost gradient region of said first or second pilot signal to the area of overlap, determine first angular orientation information between said pilot signal detector and the first positioning device, and second angular orientation information between said pilot signal detector and the second positioning device when said housing is at the area of overlap, and
determine an initial position of the mobile robot based on the first stationary location, the second stationary location, the first angular orientation information, and the second angular orientation information.

10. The mobile robot as claimed in claim 9, wherein:
said processor is configured to control said motion module to move said housing in a direction where a detected emission power of the first pilot signal detected by said pilot signal detector is increasing, and to record a first position of said housing as the first stationary location of the first positioning device when the detected emission power of the first pilot signal reaches a first predetermined power level; and
said processor is further configured to control said motion module to move said housing in a direction where a detected emission power of the second pilot signal detected by said pilot signal detector is increasing, and to record a second position of said housing as the second stationary location of the second positioning device when the detected emission power of the second pilot signal reaches a second predetermined power level.

11. The mobile robot as claimed in claim 10, wherein said processor is configured to control said motion module to rotate said housing while said pilot signal detector detects the first pilot signal and the second pilot signal when said processor determines the first angular orientation information and the second angular orientation information.

12. The mobile robot as claimed in claim 11, wherein said processor is configured to
record an initial angle of said housing when said housing moves into the area of overlap, wherein the initial angle corresponds to a difference between a first angle at which said pilot signal detector is facing when said housing moves into the area of overlap, and a second angle at which said pilot signal detector is facing at a time the mobile robot is activated, and
record detected information of the first pilot signal and the second pilot signal at predetermined angular displacements of said housing from the initial angle.

13. The mobile robot as claimed in claim 12, wherein the first angular orientation information corresponds to an angular range within which the first pilot signal is deemed as being capable of being detected by said pilot signal detector, and the second angular orientation information corresponds to an angular range within which the second pilot signal is deemed as being capable of being detected by said pilot signal detector.

14. The mobile robot as claimed in claim 13, wherein the detected information of the first pilot signal and the second pilot signal that are recorded are related to detected signal strengths of the first pilot signal and the second pilot signal at the predetermined angular displacements of said housing from the initial angle.

15. The mobile robot as claimed in claim 9, wherein the initial position (X, Y) of said housing satisfies $$\begin{cases} Y = (X - x1)\tan\phi 1 + y1 \\ Y = (X - x2)\tan\phi 2 + y2 \end{cases}$$

wherein (x1,y1) is the first stationary location of the first positioning device, (x2, y2) is the second stationary location of the second positioning device, $\phi 1$ is the first angular orientation information and $\phi 2$ is the second angular orientation information.

16. The mobile robot as claimed in claim 9, wherein said pilot signal detector includes a transmission module that is configured to receive the first and second pilot signals from the first positioning device and the second positioning device using one of ZigBee, RFID and Bluetooth protocols.

17. The mobile robot as claimed in claim 9, which is a mobile cleaning robot.

18. A positioning method for a mobile robot, comprising the steps of:
- transmitting, by a first positioning device that is disposed at a first stationary location relative to the mobile robot, a first pilot signal;
- transmitting, by a second positioning device that is disposed at a second stationary location relative to the mobile robot and the first positioning device, a second pilot signal, wherein a transmission coverage of the second pilot signal has an area of overlap with a transmission coverage of the first pilot signal;
- detecting the first and second pilot signal by the mobile robot, and moving the mobile robot along an outermost gradient region of said first or second pilot signal to the area of overlap;
- determining, by the mobile robot, first angular orientation information between the mobile robot and the first positioning device, and second angular orientation information between the mobile robot and the second positioning device; and
- determining, by the mobile robot, an initial position of the mobile robot based on the first stationary location, the second stationary location, the first angular orientation information, and the second angular orientation information.

* * * * *